(12) United States Patent
Vandonkelaar

(10) Patent No.: US 10,421,012 B2
(45) Date of Patent: Sep. 24, 2019

(54) SYSTEM AND METHOD FOR TRACKING USING MULTIPLE SLAVE SERVERS AND A MASTER SERVER

(71) Applicant: Zero Latency PTY LTD, North Melbourne (AU)

(72) Inventor: Scott Vandonkelaar, Alphington (AU)

(73) Assignee: ZERO LATENCY PTY LTD, North Melbourne (AU)

( * ) Notice: Subject to any disclaimer, the term of this patent is extended or adjusted under 35 U.S.C. 154(b) by 547 days.

(21) Appl. No.: 15/254,985

(22) Filed: Sep. 1, 2016

(65) Prior Publication Data
US 2017/0274281 A1    Sep. 28, 2017

Related U.S. Application Data

(63) Continuation-in-part of application No. 15/081,711, filed on Mar. 25, 2016, now Pat. No. 9,916,496.
(Continued)

(51) Int. Cl.
*A63F 9/00* (2006.01)
*A63F 13/352* (2014.01)
(Continued)

(52) U.S. Cl.
CPC .......... *A63F 13/352* (2014.09); *A63F 13/213* (2014.09); *A63F 13/837* (2014.09); *G06K 9/00335* (2013.01); *G06T 7/246* (2017.01); *G06T 7/60* (2013.01); *G06T 7/73* (2017.01); *G06T 7/90* (2017.01); *H04L 67/10* (2013.01); *H04L 67/22* (2013.01); *H04L 67/38* (2013.01); *H04N 9/04* (2013.01); *H04N 17/002* (2013.01); *A63F 2300/1093* (2013.01);
(Continued)

(58) Field of Classification Search
None
See application file for complete search history.

(56) References Cited

U.S. PATENT DOCUMENTS 5,490,239 A    2/1996  Myers
5,509,810 A    4/1996  Schertz et al.
(Continued)

FOREIGN PATENT DOCUMENTS

CN    101859439 A    10/2010
EP    1368788    12/2010
(Continued)

OTHER PUBLICATIONS

Arar et al., Estimating Fusion Weights of a Multi-Camera Eye Tracking System by Leveraging User Calibration Data, Proceedings of the Ninth Biennial ACM Symposium on Eye Tracking Research and Applications, 2016, pp. 225-228.
(Continued)

*Primary Examiner* — Seng Heng Lim
(74) *Attorney, Agent, or Firm* — Jennifer Hayes; Nixon Peabody LLP

(57) ABSTRACT

A virtual reality hierarchical tracking system provides real-time response in wide-ranging situations by partitioning the data collection and tracking computation across multiple slave and master servers. Each slave server manages a different subset of the tracking cameras and locates tracking markers within its own tracking camera images. A master server controls the slave servers and uses slave server results to determine the position of tracking markers.

17 Claims, 10 Drawing Sheets

Related U.S. Application Data

(60) Provisional application No. 62/357,163, filed on Jun. 30, 2016.

(51) Int. Cl.

| | | |
|---|---|---|
| *H04L 29/06* | (2006.01) | |
| *H04L 29/08* | (2006.01) | |
| *H04N 17/00* | (2006.01) | |
| *G06K 9/00* | (2006.01) | |
| *G06T 7/60* | (2017.01) | |
| *H04N 9/04* | (2006.01) | |
| *A63F 13/213* | (2014.01) | |
| *A63F 13/837* | (2014.01) | |
| *G06T 7/246* | (2017.01) | |
| *G06T 7/73* | (2017.01) | |
| *G06T 7/90* | (2017.01) | |
| *G06K 9/32* | (2006.01) | |

(52) U.S. Cl.
CPC .. *A63F 2300/513* (2013.01); *A63F 2300/8076* (2013.01); *A63F 2300/8082* (2013.01); *G06K 2009/3225* (2013.01); *G06T 2207/10024* (2013.01); *G06T 2207/30204* (2013.01)

(56) References Cited

U.S. PATENT DOCUMENTS

| | | |
|---|---|---|
| 5,717,414 A | 2/1998 | Bergsneider et al. |
| 5,751,289 A | 5/1998 | Myers |
| 5,997,439 A | 12/1999 | Oshuga et al. |
| 6,801,637 B2 | 10/2004 | Voronka et al. |
| 6,950,123 B2 | 9/2005 | Martins |
| 6,972,787 B1 | 12/2005 | Allen et al. |
| 7,046,214 B2 | 5/2006 | Bersole et al. |
| 7,071,898 B2 | 7/2006 | Hobgood et al. |
| 7,139,767 B1 | 11/2006 | Taylor |
| 7,225,548 B2 | 6/2007 | Sieracki et al. |
| 7,262,747 B2 | 8/2007 | Ebersole et al. |
| 7,479,967 B2 | 1/2009 | Bachelder et al. |
| 7,639,233 B2 | 12/2009 | Marks |
| 7,808,524 B2 | 10/2010 | Park et al. |
| 7,918,808 B2 | 4/2011 | Simmons |
| 8,115,814 B2 | 2/2012 | Iwase et al. |
| 8,131,015 B2 | 3/2012 | Hildreth |
| 8,537,113 B2 | 9/2013 | Weising et al. |
| 8,655,020 B2 | 2/2014 | Saptharishi et al. |
| 8,698,875 B2 | 4/2014 | Anguelov et al. |
| 8,705,799 B2 | 4/2014 | White et al. |
| 8,818,420 B2 | 8/2014 | Schatzberg et al. |
| 8,825,187 B1 | 9/2014 | Hamrick |
| 8,920,172 B1 | 12/2014 | Wilmink et al. |
| 8,971,574 B2 | 3/2015 | Ye et al. |
| 8,988,343 B2 | 3/2015 | Fei et al. |
| 8,988,508 B2 | 3/2015 | Yahav et al. |
| 9,068,843 B1 | 6/2015 | Sohn et al. |
| 9,147,260 B2 | 9/2015 | Hampapur et al. |
| 9,159,152 B1 | 10/2015 | Glover et al. |
| 9,215,262 B2 | 12/2015 | Oyman |
| 9,221,506 B1 | 12/2015 | Georgeson et al. |
| 9,223,786 B1 | 12/2015 | Hamrick et al. |
| 9,311,742 B1 | 4/2016 | Glover et al. |
| 9,443,352 B1 | 9/2016 | Glover et al. |
| 10,071,306 B2 | 9/2018 | Vandonkelaar |
| 2003/0120183 A1 | 6/2003 | Simmons |
| 2004/0063481 A1 | 4/2004 | Wang |
| 2004/0104935 A1 | 6/2004 | Williamson et al. |
| 2005/0168486 A1 | 8/2005 | Sato |
| 2005/0272517 A1 | 12/2005 | Funk et al. |
| 2006/0055706 A1 | 3/2006 | Perlman |
| 2006/0247070 A1 | 11/2006 | Funk et al. |
| 2007/0132785 A1 | 6/2007 | Ebersole et al. |
| 2007/0242886 A1 | 10/2007 | St. John |
| 2009/0040308 A1 | 2/2009 | Temovskiy |
| 2009/0187389 A1 | 7/2009 | Dobbins et al. |
| 2009/0209343 A1 | 8/2009 | Foxlin et al. |
| 2009/0278917 A1 | 11/2009 | Dobbins et al. |
| 2010/0075284 A1 | 3/2010 | Kozhevnikov et al. |
| 2010/0166260 A1 | 7/2010 | Huang et al. |
| 2010/0188401 A1 | 7/2010 | Gordon et al. |
| 2010/0210377 A1 | 8/2010 | Lock |
| 2012/0086728 A1 | 4/2012 | McArdle et al. |
| 2012/0142415 A1 | 6/2012 | Lindsay |
| 2012/0262558 A1 | 10/2012 | Boger |
| 2012/0321173 A1 | 12/2012 | Mitarai |
| 2012/0327194 A1 | 12/2012 | Shiratori |
| 2013/0063432 A1 | 3/2013 | Kaps et al. |
| 2013/0064427 A1 | 3/2013 | Picard et al. |
| 2013/0076616 A1 | 3/2013 | Csaszar et al. |
| 2013/0190086 A1 | 7/2013 | Maison et al. |
| 2014/0272837 A1 | 9/2014 | Becker et al. |
| 2015/0088863 A1 | 3/2015 | Horiba |
| 2015/0097719 A1 | 4/2015 | Balachandreswaran et al. |
| 2015/0116316 A1 | 4/2015 | Fitzgerald et al. |
| 2015/0124084 A1 | 5/2015 | Ikenoue |
| 2015/0149104 A1 | 5/2015 | Baker et al. |
| 2015/0193949 A1 | 7/2015 | Katz et al. |
| 2015/0193979 A1 | 7/2015 | Grek |
| 2015/0193983 A1 | 7/2015 | Katz et al. |
| 2015/0208058 A1 | 7/2015 | Denizot et al. |
| 2015/0260474 A1 | 9/2015 | Rublowsky et al. |
| 2015/0286275 A1 | 10/2015 | Huang et al. |
| 2015/0302648 A1 | 10/2015 | Zhang |
| 2016/0026253 A1 | 1/2016 | Bradski et al. |
| 2016/0027220 A1 | 1/2016 | Jimenez |
| 2016/0041391 A1 | 2/2016 | Van Curen et al. |
| 2016/0049085 A1 | 2/2016 | Beeson |
| 2016/0054837 A1 | 2/2016 | Stafford |
| 2016/0063731 A1 | 3/2016 | Yamamoto et al. |
| 2016/0124502 A1 | 5/2016 | Sawyer et al. |
| 2016/0225156 A1 | 8/2016 | Ikenoue |
| 2016/0232715 A1 | 8/2016 | Lee |
| 2016/0257000 A1 | 9/2016 | Guerin et al. |
| 2016/0364219 A9 | 12/2016 | Higgins |
| 2016/0364910 A1 | 12/2016 | Higgins |
| 2017/0039881 A1 | 2/2017 | Belch et al. |
| 2017/0274275 A1 | 9/2017 | Vandonkelaar |
| 2017/0274277 A1 | 9/2017 | Vandonkelaar |
| 2017/0277940 A1 | 9/2017 | Vandonkelaar |
| 2017/0289221 A1 | 10/2017 | Khalid et al. |
| 2017/0319956 A1 | 11/2017 | Vandonkelaar |
| 2018/0043247 A1 | 2/2018 | Vandonkelaar |
| 2018/0150686 A1 | 5/2018 | Vandonkelaar |

FOREIGN PATENT DOCUMENTS

| | | |
|---|---|---|
| WO | 2006103662 A2 | 10/2006 |
| WO | WO 2015/048890 A1 | 4/2015 |
| WO | 2015123771 A1 | 8/2015 |
| WO | WO 2015/123774 A1 | 8/2015 |
| WO | 2018/002698 A1 | 1/2018 |
| WO | 2018/029515 A1 | 2/2018 |
| WO | 2018/037269 A1 | 3/2018 |

OTHER PUBLICATIONS

Ehrl et al., A Reliability Measure for Merging Data from Multiple Cameras in Optical Motion Correction, Proc. ISMRM Scientific Workshop—Motion Correction in MRI, 2014, 1 page.

Guerra-Filhol, Optical Motion Capture: Theory and Implementation, Journal of Theoretical and Applied Informatics (RITA), 2005, vol. 12(2), pp. 1-29.

Mannberg et al., High Precision Real-Time 3D Tracking Using Cameras, Infotech at Aerospace, American Institute of Aeronautics and Astronautics, 2011, pp. 1-11.

Vasylevska et al., Influence of Vertical Navigation Metaphors and Presence, Proceedings of the International Society for Presence Research, 2014, pp. 205-212.

International Search Report and Written Opinion for PCT/IB2016/057844 dated Feb. 22, 2017, 15 pages.

International Search Report and Written Opinion for PCT/IB2016/057845 dated Mar. 3, 2017, 10 pages.

(56) References Cited

OTHER PUBLICATIONS

International Search Report and Written Opinion for PCT/IB2016/000374 dated Nov. 15, 2016, 10 pages.
International Search Report and Written Opinion for PCT/IB2016/000381 dated Dec. 23, 2016, 15 pages.
International Search Report and Written Opinion for PCT/US2016/000374 dated Nov. 15, 2016, 10 pages.
International Search Report and Written Opinion for PCT/IB2017/054513 dated Oct. 13, 2017, 12 pages.
Li, Y., Development of Immersive and Interactive Virtual Reality Environment for Two-Player Table Tennis, Diss. University of Central Lancashire, 2012, pp. 96-99.
International Preliminary Report on Patentability for PCT/IB2016/000374 dated Sep. 28, 2018, 8 pages.
International Preliminary Report on Patentability for PCT/IB2016/057842 dated Jan. 1, 2019, 6 pages.
International Preliminary Report on Patentability for PCT/IB2016/057844 dated Feb. 12, 2019, 9 pages.
International Preliminary Report on Patentability for PCT/IB2016/057845 dated Feb. 26, 2019, 7 pages.

Camera and Server Synchronization Process

S402
Locate tracking markers in the game space using cameras communicating with the slave servers.

S404
Transmit positions of the tracking markers to the master server.

S406
At the master server, create a list of all intersection points where a position of a first marker seen by one camera matches a position of a second marker seen by another camera

S408
For each intersection point, averaging the positions of the first and second markers to create a processed position for the intersection point that represents a position of a composite tracking marker corresponding to both the first and second markers.

Figure 4

Initial Position Calibration Process

S602

Place a calibration object in a game space so it is visible to a plurality of one or more color cameras, the calibration object comprising at least three colored calibration marker lights mounted in a specified orientation on the calibration object, and wherein the calibration object is placed in the game space in a specified orientation relative to the one or more color cameras;

↓ S604

For each color camera, determine in an image captured at the camera, a position of each of the calibration marker lights, and convert each of these positions to vectors relative to a zero origin;

↓ S606

Analyze the vectors to determine a best fit for the position of each calibration marker light, and convert the detected orientation of the calibration object into a position and orientation respective of the camera for use thenceforth in operation of the game.

Figure 6

SYSTEM AND METHOD FOR TRACKING USING MULTIPLE SLAVE SERVERS AND A MASTER SERVER

CROSS-REFERENCE TO RELATED APPLICATIONS

This application is a continuation-in-part of U.S. patent application Ser. No. 15/081,711, titled: Systems and Method for Operating a Virtual Reality Environment Reality Using Colored Marker Lights Attached to Game Objects," filed Mar. 25, 2016, the entirety of which is hereby incorporated by reference.

The present patent application also claims priority to provisional application No. 62/357,163, entitled "System and Method for Tracking Using Multiple Servers and a Master Server", filed Jun. 30, 2016, the entirety of which is herein incorporated by reference.

BACKGROUND

1. Field

This invention relates to the field of virtual reality and in particular to systems and methods which track object locations using colored tracking marker lights and a plurality of color cameras.

2. Related Art

Conventional virtual reality systems which allow free-roaming for players use infrared tracking to determine the positions of players and other objects. Alternatively, a tracking system using colored marker lights has advantages in the ability to differentiate players and objects, however accurately tracking markers over a relatively broad space or other virtual reality environment is difficult without using a plurality of cameras. Using a plurality of cameras presents a challenge with respect to position calibration, coordination, and synchronization. Also, issues related to colored tracking markers conflicting with each other as players roam about a space used for virtual reality environment also present a challenge as markers with the same color may come within a close proximity to one another.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

One approach to overcome the issues in the conventional art is to optimize the color assignment of the tracking market lights based on spatial proximity and to more accurately synchronize and calibrate the tracking cameras.

In light of the above, there is a need for systems and methods to calibrate and synchronize cameras while preventing conflicts between colored tracking markers in a virtual reality setting. Therefore, the inventors have developed a system, and method for operating a virtual reality as described below.

According to an aspect of an exemplary embodiment, a system for operating a virtual reality including at least one space includes at least one color camera configured to view the at least one space, at least one object, wherein the at least one object comprises at least one of a player, a controller and a device related to the virtual reality, at least one colored light attached to each of the at least one object configured to be used as a tracking marker, at least one server configured to track movements of the at least one object during the virtual reality, a memory containing machine readable medium comprising machine executable code having stored thereon instructions for tracking the movements of the at least one object; and a control system comprising a processor or processors coupled to the memory, the control system configured to execute the machine executable code to cause the control system to assign a color choice to each of the at least one colored light, wherein the assignment of the first color to the first colored light from among the at least one colored light is based on a spatial proximity of the first colored light to other colored lights in the at least one space, wherein during the virtual reality, if a second colored light, from among the at least one colored light, having the first color comes within a specified distance of the first colored light, the control system is further configured to change the assignment of color of one of the first colored light or the second colored lights to a color different that the first color.

According to another exemplary embodiment, if a total number of distinct assignable colors is greater than or equal to a total number of the at least one colored light, the control system is further configured to assign each of the at least one colored light a distinct color from among the total number of distinct assignable colors.

According to another exemplary embodiment, if a total number of distinct assignable colors is smaller than a total number of the at least one colored light, the control system is further configured to assign a distinct color from among the total number of distinct assignable colors to a first set of the at least one colored light, and assign a color to each colored light from among a second set of the at least one colored light based on spatial proximity of each colored light from among the second set of the at least one colored light to remaining colored lights with assigned colors.

According to another exemplary embodiment, the color choice for each of the at least one colored lights is one of White (R,G,B), Red (R), Blue (B), Green (G), Yellow (R,G), Cyan (B,G) and Magenta (R,B).

According to another exemplary embodiment, the color choice for each of the at least one colored lights further comprises half intensity secondary and tertiary colors.

According to another exemplary embodiment, the specified distance is 5 meters.

According to another aspect of an exemplary embodiment, a method for operating a virtual reality including at least one space, at least one color camera, at least one object, at least one colored light attached to each of the at least one object, at least one processor, and at least one server, the method includes viewing, using at least one of the at least one color camera, the at least one space, assigning, using at least one of said at least one processor, a first color to a first colored light from among the at least one colored light, within the at least one space based on a spatial proximity of the first colored light to other colored lights in the at least one space, tracking, using at least one of said at least one server, movements of the at least one object, and changing, using at least one of said at least one processor, if a second colored light, from among the at least one colored light, having the first color comes within a specified distance of the first colored light, the assignment of color of one of the first colored light or the second colored lights to a color different that the first color, wherein the at least one object comprises at least one of a player, a controller and a device related to the virtual reality.

According to another exemplary embodiment, if a total number of distinct assignable colors is greater than or equal to a total number of the at least one colored light, the assigning further includes assigning each of the at least one colored light a distinct color from among the total number of distinct assignable colors.

According to another exemplary embodiment, if a total number of distinct assignable colors is smaller than a total number of the at least one colored light, the assigning further includes assigning a distinct color from among the total number of distinct assignable colors to a first set of the at least one colored light, and assigning a color to each colored light from among a second set of the at least one colored light based on spatial proximity of each colored light from among the second set of the at least one colored light to remaining colored lights with assigned colors.

According to another exemplary embodiment, the color choice for each of the at least one colored lights is one of White (R,G,B), Red (R), Blue (B), Green (G), Yellow (R,G), Cyan (B,G) and Magenta (R,B).

According to another exemplary embodiment, the color choice for each of the at least one colored lights further comprises half intensity secondary and tertiary colors.

According to another exemplary embodiment, the specified distance is 5 meters.

According to another aspect of an exemplary embodiment, a system for operating a virtual reality including at least one space includes at least one color camera configured to view the at least one space, at least one object, wherein the at least one object comprises at least one of a player, a controller and a device related to the virtual reality, at least one colored light attached to each of the at least one object configured to be used as at least one tracking marker, a communication link, at least one server, comprising a hierarchy of at least one slave server and a master server, configured to track movements of the at least one object during the virtual reality, a memory containing machine readable medium comprising machine executable code having stored thereon instructions for tracking the movements of the at least one object, and a control system comprising a processor or processors coupled to the memory, the control system configured to execute the machine executable code to cause the control system to locate, using the at least one slave servers, the position of the at least one tracking marker within view of the at least one color camera, transmit, via the communication link, position of the at least one tracking marker to the master server, create, using the master server, a list of all intersection points where a position of a first tracking marker, from among the at least one tracking marker, seen by one of the at least one color camera matches a position of a second tracking marker, from among the at least one tracking marker, seen by another of the at least one color camera, and average, for each intersection point, the positions of the first tracking marker and the second tracking marker to create a processed position for the intersection point that represents a position of a composite tracking marker corresponding to both the first tracking marker and the second tracking markers.

According to an aspect of another exemplary embodiment, a method for operating a virtual reality including at least one space, at least one color camera, a communication link, at least one object, at least one colored light attached to each of the at least one object configured to be used as at least one tracking marker, at least one processor, and at least one server comprising a hierarchy of at least one slave server and a master server, the method includes viewing, using at least one of the at least one color camera, the at least one space, tracking, using at least one of said at least one server, movements of the at least one object, locating, using the at least one slave servers, the position of the at least one tracking marker within view of the at least one color camera, transmitting, via the communication link, position of the at least one tracking marker to the master server, creating, using the master server, a list of all intersection points where a position of a first tracking marker, from among the at least one tracking marker, seen by one of the at least one color camera matches a position of a second tracking marker, from among the at least one tracking marker, seen by another of the at least one color camera, and averaging, using at least one of said at least one processor, for each intersection point, the positions of the first tracking marker and the second tracking marker to create a processed position for the intersection point that represents a position of a composite tracking marker corresponding to both the first tracking marker and the second tracking markers, wherein the at least one object comprises at least one of a player, a controller and a device related to the virtual reality.

According to another aspect of an exemplary embodiment, a system for operating a virtual reality including at least one space includes at least one color camera configured to view the at least one space, at least one object, wherein the at least one object comprises at least one of a player, a controller and a device related to the virtual reality, at least one colored light attached to each of the at least one object configured to be used as at least one tracking marker, at least one server configured to track movements of the at least one object during the virtual reality, a memory containing machine readable medium comprising machine executable code having stored thereon instructions for tracking the movements of the at least one object, and a control system comprising a processor or processors coupled to the memory, the control system configured to execute the machine executable code to cause the control system to detect a calibration object placed in a space visible to each of the at least one color camera, wherein the calibration object comprises at least three colored calibration marker lights mounted in specified positions on the calibration object, and wherein the calibration object is placed in the space in a specified orientation relative to the at least one colored camera, determine in a captured image at each of the at least one color camera, a position of each of the at least three calibration marker lights, convert each of the determined positions to vectors relative to a zero origin, analyze the vectors to determine a best fit for a position of each calibration marker light, and convert the detected orientation of the calibration object into a position and orientation respective to at each of the at least one color camera for use thenceforth in operation of the virtual reality.

According to another exemplary embodiment, the calibration object is "L" shaped and comprises three colored calibration marker lights.

According to another exemplary embodiment, each leg of the "L" shape of the calibration object is 1 meter in length.

According to another exemplary embodiment, the three colored calibration marker lights are colored green, blue, and red.

According to another aspect of an exemplary embodiment, a method for operating a virtual reality including at least one space, at least one color camera, at least one object, at least one colored light attached to each of the at least one object, at least one processor, and at least one server, the method includes viewing, using at least one of the at least one color camera, the at least one space, tracking, using at least one of said at least one server, movements of the at least one object, detecting, using at least one of said at least one processor, a calibration object placed in a space visible to each of the at least one color camera, wherein the calibration object comprises at least three colored calibration marker lights mounted in specified positions on the calibration object, and wherein the calibration object is placed in the space in a specified orientation relative to the at least one colored camera, determining, using at least one of said at least one processor, in a captured image at each of the at least one color camera, a position of each of the at least three calibration marker lights, converting, using at least one of said at least one processor, each of the determined positions to vectors relative to a zero origin, analyzing, using at least one of said at least one processor, the vectors to determine a best fit for a position of each calibration marker light, and converting, using at least one of said at least one processor, the detected orientation of the calibration object into a position and orientation respective to at each of the at least one color camera for use thenceforth in operation of the virtual reality, wherein the at least one object comprises at least one of a player, a controller and a device related to the virtual reality.

According to another exemplary embodiment, the calibration object is "L" shaped and comprises three colored calibration marker lights.

According to another exemplary embodiment, each leg of the "L" shape of the calibration object is 1 meter in length.

According to another exemplary embodiment, the three colored calibration marker lights are colored green, blue, and red.

According to another exemplary embodiment, a tracking system for a virtual reality system is disclosed that includes a master tracking server; a first slave tracking server in communication with the master tracking server; a second slave tracking server in communication with the master tracking server; and a plurality of cameras coupled to at least one of the first slave tracking server or second slave tracking server, wherein the first slave tracking server and second slave tracking server are configured to search for tracking markers in images received from the plurality of cameras, and wherein the first slave tracking server and second slave tracking server are further configured to communicate the tracking marker search results to the master tracking server.

The master tracking server may provide a real-time response for multiple situations involving a variable number of the plurality of cameras. The multiple situations may different arena sizes or different numbers of players.

Each of the first and second slave tracking servers may receive image data from a different subset of the plurality of cameras.

The master tracking server may send a search specification to at least one of the first and second slave tracking servers. The search specification may include a list of tracking markers to look for, a color of each of the tracking markers and an indication of expected positions of the tracking markers.

Each of the first and second slave tracking servers may return tracking marker directions from the plurality of cameras to the master tracking server. The master tracking server may be configured to determine tracking marker positions based on the tracking marker directions.

The master tracking server may be in communication with a game server.

According to another exemplary embodiment, a method is disclosed that includes preparing one or more search specifications; communicating the one or more search specifications to a plurality of slave tracking servers; reading search results from each plurality of slave tracking servers based on the search specification; determining the position of each known tracking marker by finding a best point of intersection of a tracking marker's vectors based using the search results; computing a motion vector for each known tracking marker with the determined position; and communicating updated tracking marker positions based on the computed motion vector and determined position to a game server.

The one or more search specifications may include a list of known tracking markers, and for each of the known tracking numbers, a tracking marker identifier, the color of the tracking marker, the expected position of the tracking marker, the search range of the tracking marker. The one or more search specifications may further include new-unknown-tracking-marker search parameters.

The method may further include, for each tracking marker: assigning the tracking marker identifier to the tracking marker; specifying the color of the tracking marker; and specifying an expected position and search range.

The method may further include, for each tracking marker: computing the expected position and search range.

The method may be completed on one camera video frame at a time.

The search results may include 3-dimensional vectors between a camera and a tracking marker. The 3-dimensional vectors comprise pitch, roll and yaw angles relative to specified camera, x, y and z differences compared to a specified camera, or a pair of xyz coordinates.

The search results may include a list of tracking marker identifiers and vector pairs.

Unknown tracking marker vectors may be indicated in the search results by specifying an unknown tracking identifier.

The search results may include a list of tracking marker id, a camera id, a found/not-found/unknown-found status, a color-found and a vector.

According to a further aspect of the invention, a method is disclosed that includes reading a search specification received from a master tracking server; searching each camera's latest image for each of the tracking markers; searching for each tracking marker color at the tracking marker's expected tracking position; searching outwards in a circular manner until it finds the tracking marker or exceeds the search range; translating the search range from a physical distance into a range of pixels in the image; computing a 3-dimensional vector from the camera to the tracking marker; preparing search results, the search results comprising the 3-dimensional vector of the located tracking marker; and transmitting the search results to the master tracking server.

The cameras may be synchronized so that all cameras images are captured at the same time. The camera images may be captured at different times.

The method may further include reading one camera image while searching for tracking markers in a previous image.

The method may be completed on one camera video frame at a time.

The method may further include searching for new tracking markers using new-unknown-tracking-marker search parameters; and computing a 3-dimensional vector from the camera to the tracking marker; wherein the search results further include the 3-dimensional vector of the new tracking markers.

The new-unknown-tracking-marker search parameters provide guidance on how to search for new unknown markers.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

FIG. 4 depicts a flowchart for synchronizing a plurality of cameras with consistent and accurate location of game objects, according to an exemplary embodiment;

FIG. 6 depicts a flowchart for initial position calibration of each of a plurality of cameras using a calibration object, according to an exemplary embodiment.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Systems and methods are disclosed for operating, calibrating, and dynamically optimizing a system for a virtual reality environment where colored marker lights are attached to objects.

The objects may include players, controllers, and devices related to the game or another virtual reality experience.

One or more color cameras are used to view one or more spaces, and track positions and orientations of players and other objects according to the attached marker lights. A hierarchical system of servers is used to process positions and orientations of objects and provide controls as necessary for the system. A method for color assignment is described as well as a calibration process, and a dynamic optimization process. A synchronization process is also described that ensures that a plurality of cameras and attached servers are properly coordinated. Head-mounted devices may also be used in conjunction with marker lights to provide information regarding players.

Figure 1:
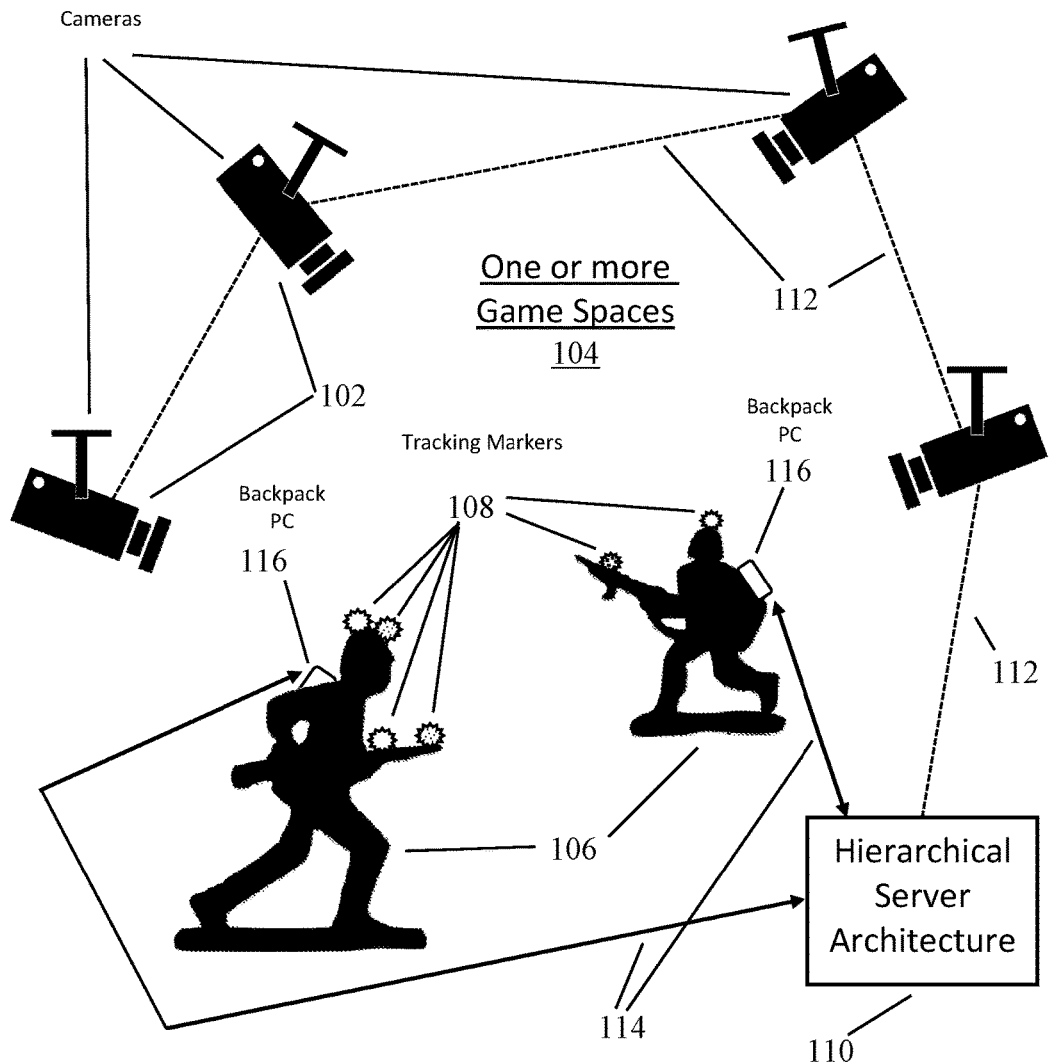
FIG. 1 depicts a system comprising a plurality of cameras which track objects such as players and controllers with tracking markers attached thereto, according to an exemplary embodiment.

FIG. 1 depicts a system comprising a plurality of cameras which track objects such as players and controllers with tracking markers attached thereto, according to an exemplary embodiment. For instance, pictured in FIG. 1 is a plurality of color cameras 102 viewing one or more spaces 104 of a virtual reality. A plurality of spaces or other virtual reality environments in the same physical space are supported by a logical or virtual division of the physical space into a plurality of virtual spaces where a single game may be operated in one of the plurality of virtual spaces or other virtual reality environments. Cameras 102 or other optical detectors suitable of detecting radiation from tracking markers 108, including infrared detectors, RGB cameras, hyperspectral sensors, and others.

The space/spaces being viewed by the camera, as described above and hereafter throughout the specification may include any kind of space used by a user/player to participate in the virtual reality experience, the virtual reality experience comprising a virtual reality game or any other form of virtual reality experience.

Typically, at least two cameras 102 are utilized to observe the one or more spaces 104 or other virtual reality environments, however the limit to the number of cameras 102 is not limited thereto and only a single camera or more than two cameras may be utilized to observe the one or more spaces 103. Cameras 102 may be connected to a hierarchical server architecture 110 which analyzes images viewed by cameras 102 and communicates with players 106 and other objects such as game controllers, simulated weapons etc., all of which include tracking markers 108 for observation by cameras 102. The hierarchical server architecture 110 will be described in more detail below, with reference to FIG. 3 and FIG. 4.

Connections 112 between cameras 102 and server architecture 110 may be either hardwired such as Ethernet, or alternately wirelessly connected such as, for example, Wi-Fi connectivity. However, the form of connection 112 is not limited thereto and other forms of establishing a network may be used. Communication between server architecture 110 and players 106 and other game objects for both control and sensing purposes may be performed through wireless connectivity 114 which may include Wi-Fi connectivity or other forms of wireless connectivity.

According to another embodiment, communication between the server architecture 110 and players 106 may be performed through a wired connection. For some embodiments of the invention, players 106 may carry a form of backpack PC 116 which may interface electronically with a form of head-mounted device and/or a controller or simulated weapon device carried by the player. Alternately, backpack PC 116 may communicate wirelessly and directly with the head-mounted device and or the controller or simulated weapon device carried by the player, however this form of communication is not limited thereto and the communication may be performed via a wired connection.

Figure 2:
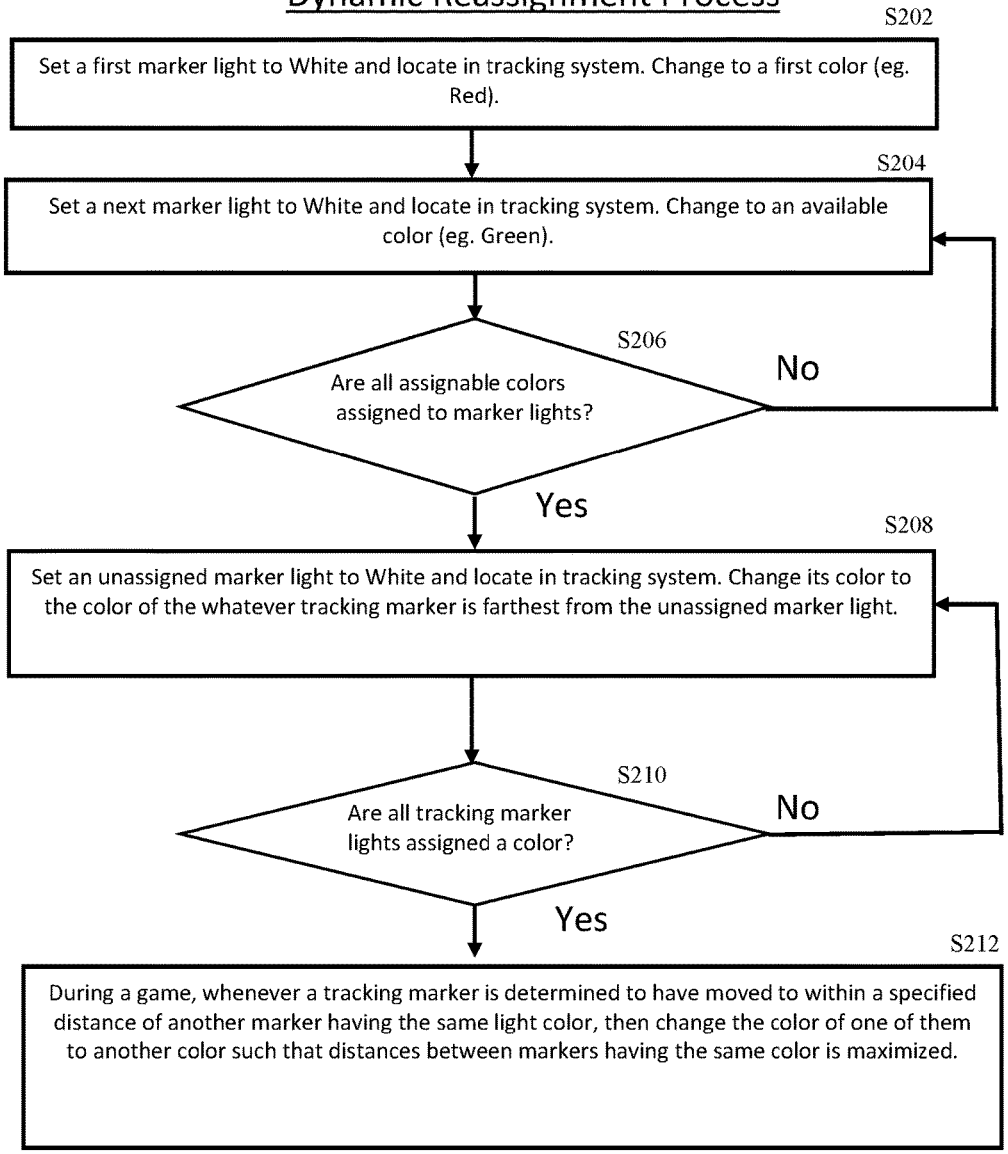
FIG. 2 depicts a flowchart for initial color assignment before play as well as dynamic reassignment of colors during game play, according to an exemplary embodiment.

An example process for initial color assignment for the tracking marker lights 108 before play, and for dynamic color reassignment for the marker lights 108 during play, is shown in FIG. 2. In step S202, a first marker light 108 is set to white, then is viewed by one or more cameras 102, and is located in the tracking system of depicted in FIG. 1. The first marker light 108 is then changed to a first color, for example red. Next, in step S204 a next marker light 108 is set to white and located by the tracking system in the same manner as step S202. Subsequently, this next marker light 108 is changed to a different available color, for example green.

In other examples, the tracking marker lights 108 may be other light or radiation sources, including fluorescent light sources, infrared bulbs, or other types of light sources.

At this point, it is determined, per step S206, if all assignable colors have been assigned to marker lights 108. If not, step S204 is executed again with a next marker light 108 and changed to a next available color which might be, for example, blue, since red and green have been assigned. If all assignable colors have been assigned to marker lights 108 the process proceeds to step S208. Note that an exemplary list of assignable colors may comprise White (R,G,B), Red (R), Blue (B), Green (G), Yellow (R,G), Cyan (B,G), Magenta (R,B). This list of assignable colors is merely exemplary and color variations in-between the listed available colors are also possible.

In step S208, the process starts assigning colors to new unassigned marker lights 108 where the color has been previously assigned to at least one other marker light 108. As such, the system considers the distance from the new unassigned marker light 108 to the previously assigned marker lights 108 in making a color choice. Per step S208, a next unassigned marker light 108 is set to white and located in the tracking system. Subsequently its color is changed to be the same as whichever tracking marker, previously assigned with a color, is farthest from this next unassigned marker light 108. In step S210 it is determined if all tracking marker lights 108 have been assigned a color. If not, step S208 is repeated until all marker lights 108 have been assigned a color. Otherwise, the process proceeds to cover dynamic color reassignment during operation of a game.

Per step S212, whenever during a game a tracking marker 108 is determined to have moved within a specified minimum distance of another tracking marker 108 having the same light color, the color of one of the two tracking markers is changed to another color such that distances between markers having the same color is maximized. The specified distance may vary based on the size of the game arena. As such, one of the tasks of the server architecture 110 is to keep track of all distances between tracking markers 108 having the same color, and compare those distances with the specified minimum distance.

Figure 3:
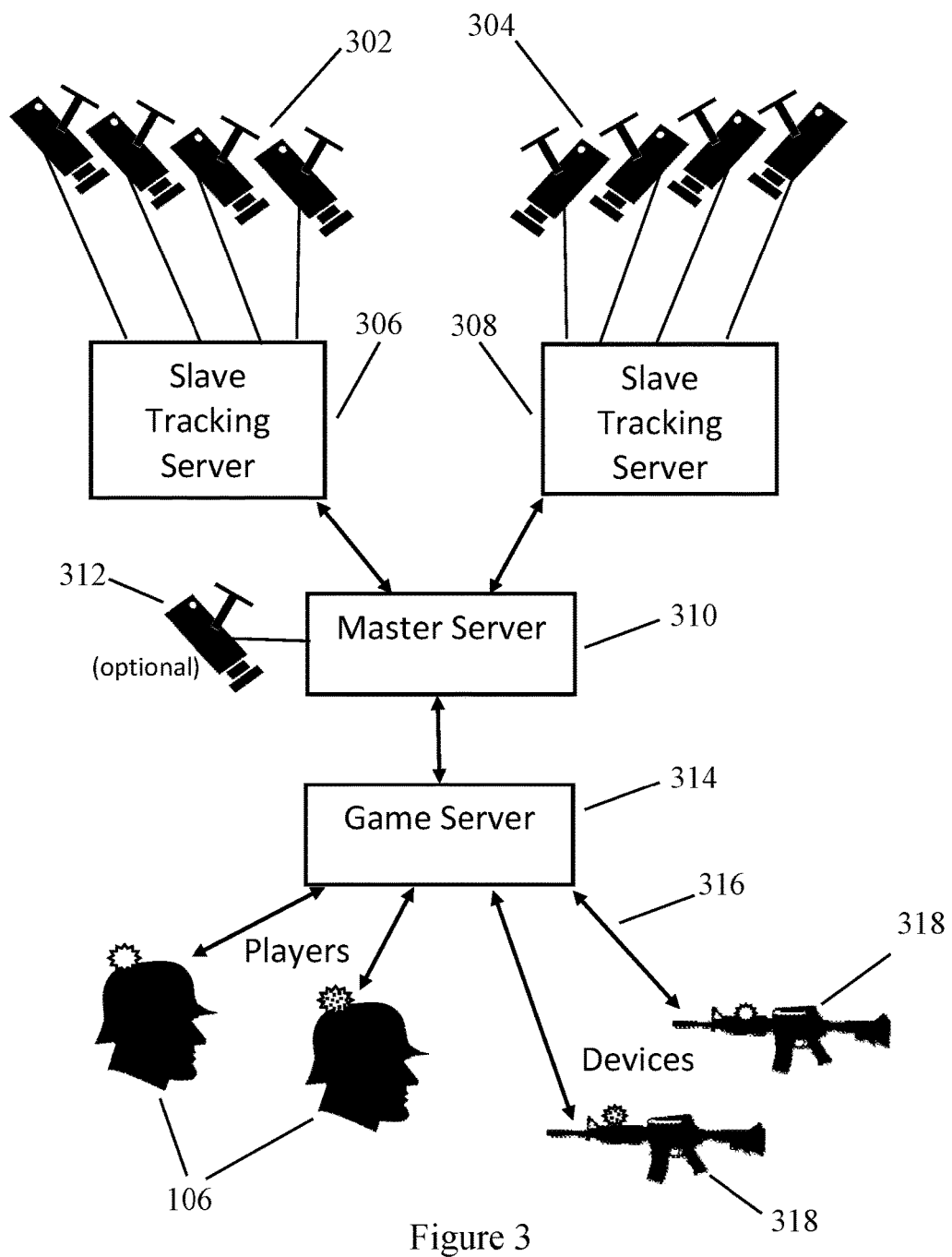
FIG. 3 depicts a system comprising a plurality of cameras, players, and controllers connected to a hierarchical server architecture, according to an exemplary embodiment.

FIG. 3 depicts a system comprising a plurality of cameras, players, and controllers connected to a hierarchical server architecture, according to an exemplary embodiment. Here, one bank of color cameras 302 connects with slave tracking server 306, while another bank of color cameras 304 connects with slave tracking server 308. Positions and movements of game objects tracked by slave tracking servers 306 and 308 are consolidated in master server 310 which may optionally have one or more local cameras 312 connected to it. Note that calibration of tracking marker 108 positions may be performed locally on the server(s) observing that tracking marker. The number of slave tracking servers and master server depicted in FIG. 3 is merely exemplary and not limited thereto. Furthermore, the functionality of the slave tracking server and the master tracking server may be combined into a single server, according to an exemplary embodiment.

When a slave tracking server such as 306 or 308 receives an image, they immediately process the image to identify any tracking markers in the optical data of the image. The slave tracking server 308 immediately sends the processed data to the master server 310 and performs no further processing on that particular image, according to an exemplary embodiment. This may include identifying a pixel row and column location of the tracking marker 108, including with a time stamp camera identification.

Master server 310 interfaces with game server 314 which communicates wirelessly 316 with players 106 and other devices 318 which may include for example any of controller devices including simulated weapons, according to one exemplary embodiment. The communication may even be conducted via a wired connection, according to another exemplary embodiment.

The Master server 310 collects all the processed data from both local cameras 312 and slave servers 306 and 308. It continues to store all this information until it has a complete set of data from each camera in the system or until it receives repeated data from the same camera. Once the data set is considered complete, it performs the next stage of processing on each individual camera image to create a list of all the intersections of the data points from the cameras where the tracking marker is a match. Positions of these intersection points are then averaged out to create the final processed position for each tracking marker. Where not enough information is available to create an accurate intersection or the information conflicts within a threshold, the information may be optionally discarded.

FIG. 4 depicts a flowchart illustrating this process for synchronizing a plurality of cameras with consistent and accurate locations of objects, according to an exemplary embodiment. In step S402, tracking markers in the space are located using cameras 302 and 304 communicating with slave servers 306, 308. In step S404, positions of tracking markers are communicated from the various slave servers 306, 308 to master server 310. In step S406 a process operating on the master server creates a list of all intersection points where a position of a first marker seen by one camera matches a position of a second marker seen by another camera. Then in step S408, for each intersection point in the list of intersection points, the positions of the first and second tracking markers are averaged to create a processed position for that intersection point, and represents a position of a composite tracking marker corresponding to both the first and second tracking markers that will be used thenceforth in operation of the game.

The master server 310 and the slave servers 306,308 are exemplary embodiment forming part of the hierarchy server where the master server 310 may have unidirectional control over the slave servers 306, 308. However, the master and the slave servers may be incorporated into a single server which performs the below defined functions of both the master server 310 and the slave server 306, 308, according to an exemplary embodiment.

Figure 5:
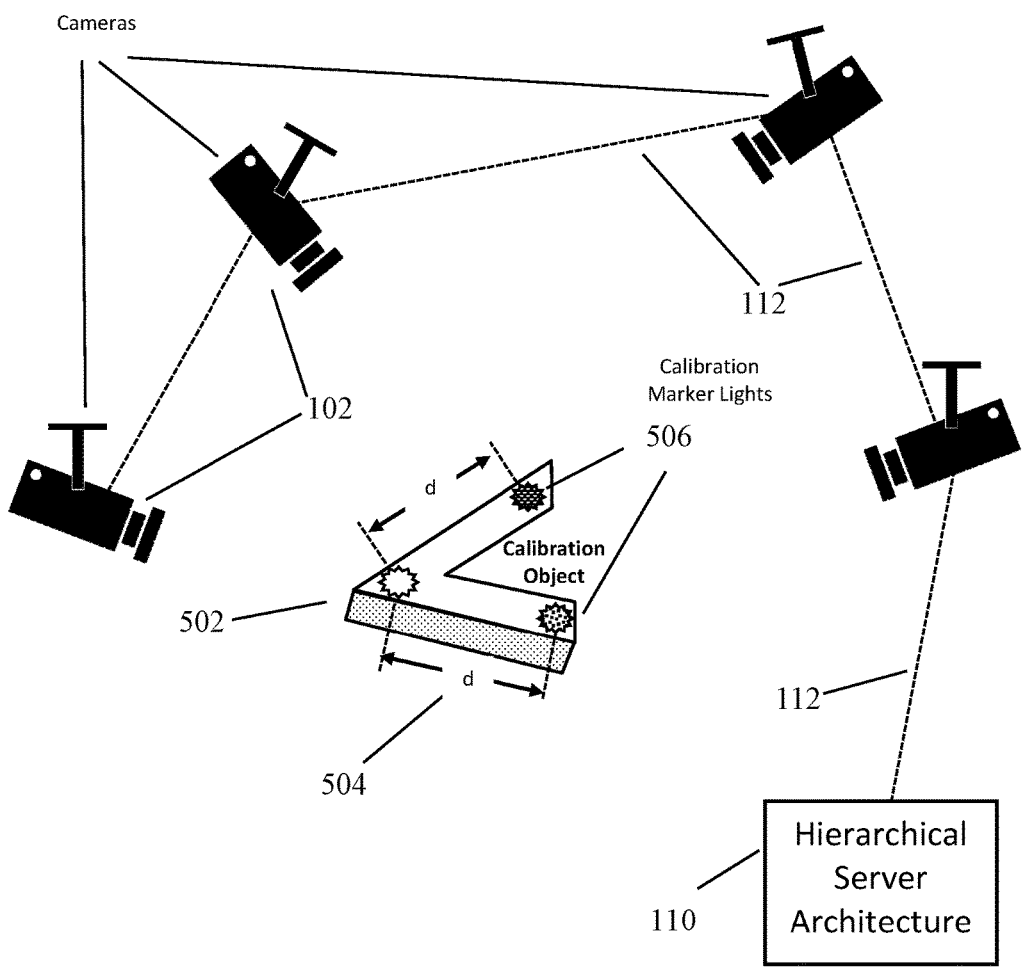
FIG. 5 depicts a system for position calibration of each of a plurality of cameras using a calibration object, according to an exemplary embodiment.

Before game begins, it is important to calibrate the system such that cameras observing a space or other virtual reality environment are accurately coordinated with respect to positions of game objects. FIG. 5 depicts a system performing an initial calibration using a calibration object 502.

When the system is initially set up, all the cameras are plugged in and nothing is configured for the space. It is important that the tracking servers are programmed with position with the position and orientation of the cameras in 3D space.

To do this, one exemplary calibration configuration according to the invention involves laying out a 1 meter grid on the flat ground. This could be achieved using masking tape or other available means. This grid is visible to the cameras. The grid serves as a guide for where the virtual space will be defined, and a center point is chosen in the room to be the center in the virtual space (x:0, y:0, z:0).

Then, a calibration device 502 is placed on the 1-meter grid. One exemplary configuration for the calibration device is an L-shape (90 degree angle) with arms each measuring 1 meter long (dimension "d" 504), with a colored ball or calibration marker light 506 at each end of the arm and also at the center. The length mentioned above is merely exemplary and a different shape and size of calibration device with a different number of marker lights 506 may be used.

These colored balls or calibration marker lights 506 may be powered, and set to fixed colors. An exemplary configuration would include Green in the center, Blue on one arm and Red on the other, however different colors may be used. By placing the calibration device in the grid at the center of the space, with the blue arm oriented in a specific direction, the calibration software can automatically detect the location of the cameras which can see all 3 colored markers on the calibration device.

The calibration process allows the operator to select a camera, and perform the following process:

1) Detect the 3 colored markers are in the next image to come from the camera and record their positions in the image.

2) Convert the positions in the image to vectors from a zero origin, pointing to the recorded position.

3) The vectors are analyzed to find the 'best fit' which would allow the markers to show up in that position.

4) When the right fit is found, the detected orientation of the calibration device is converted into a position and orientation for the camera.

5) The position and orientation is associated with the camera.

This initial calibration process is further described in the flowchart of FIG. 6 where step S602 describes placing a calibration object in a space so it is visible to a plurality of one or more color cameras, the calibration object comprising at least three colored calibration marker lights 506 mounted in a specified orientation on the calibration object, and wherein the calibration object is placed in the space in a specified orientation relative to the one or more cameras. Per step S604, for each camera, a position of each of the calibration marker lights is determined in a captured image, and each of these positions is converted to vectors relative to a zero origin. Then per step S606, the vectors are analyzed to determine a best fit for the position of each calibration marker light and the detected orientation of the calibration object is converted into a position and orientation respective of the camera for use thenceforth in operation of the game.

The detected calibration for the camera can be validated by the operator as the system may also draw a dotted line over the video feed to show where it believes the grid on the floor should be. In the instance where the calibration device is not available, the cameras may be configured manually using the dotted line overlay. All camera calibration data is then stored on the tracking system server that the cameras are connected to (be it a slave server, master server or a combination of the two).

Figure 7:
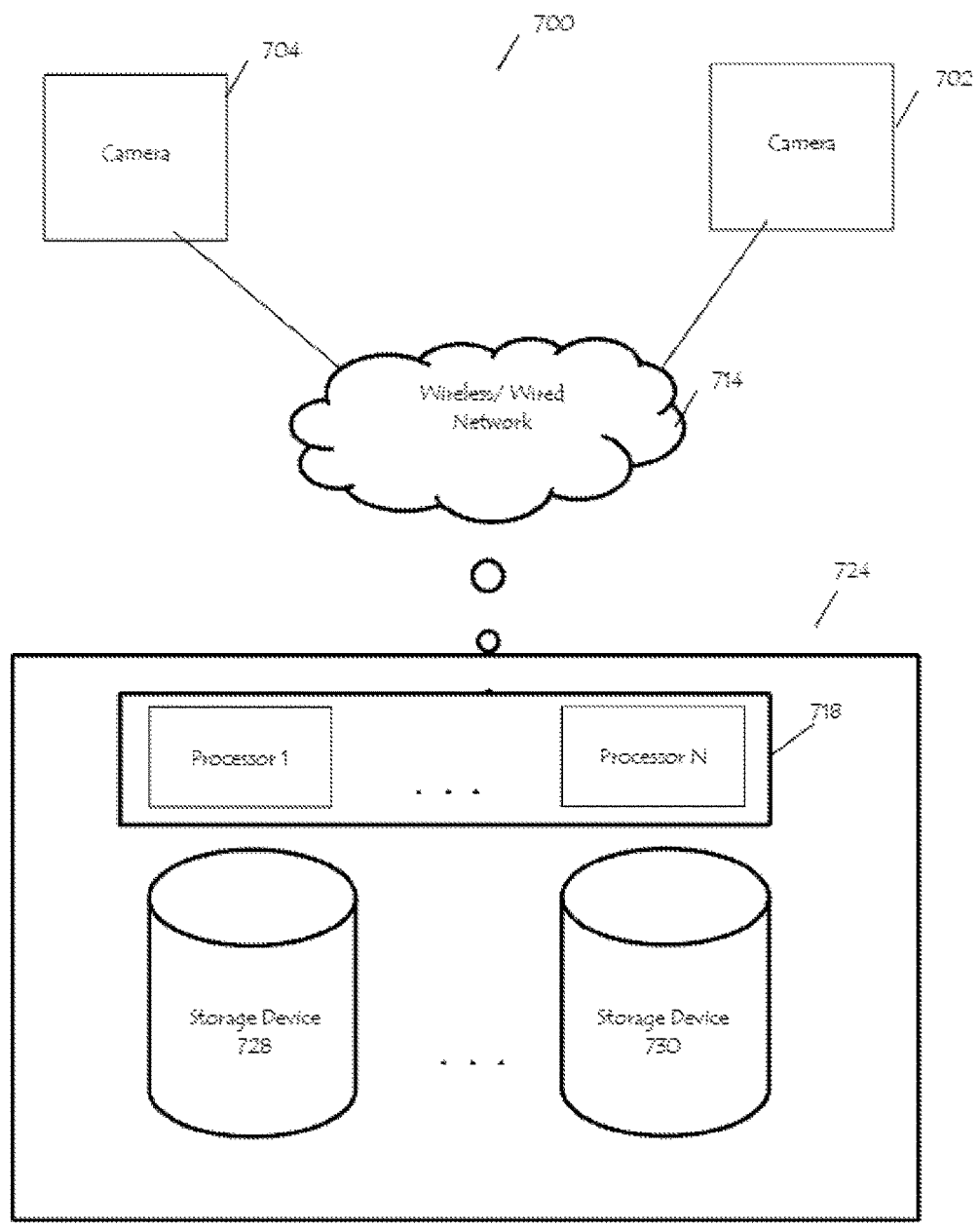
FIG. 7 depicts a block diagram of a system of a plurality of cameras communicating with a server, according to another exemplary embodiment.

FIG. 7 depicts a block diagram of a gaming system 700, according to another exemplary embodiment. The system 700 includes Cameras 702 and 704 and VR server 724. The cameras, 702 and 704, may be capable of accessing the VR server 724 either directly or indirectly over a network 714. The cameras, 702 and 704, may access the VR server 724 over the network 714 using wireless or wired connections supporting one or more point-to-point links, shared local area networks (LAN), wide area networks (WAN), or other access technologies. These cameras 702 and 704 may be transmitting video, audio or other kinds of data to the VR server 724.

According to the exemplary embodiment depicted in FIG. 7, the VR system 700 is a type of system that provides tracking of marker lights on players or their controllers or other game objects using cameras 702 and 704 using storage devices 728, 730 and multiple processors 718. However, it should be appreciated that alternate embodiments of the VR system 700 may use a single processor and storage device and the depicted embodiment is merely exemplary. Furthermore, although FIG. 7 depicts a single server 724, the VR system may comprise multiple servers splitting up the functionalities which are performed by the depicted server 724, as described in the exemplary embodiment of FIG. 1.

In the exemplary embodiment depicted in FIG. 7, the VR server 724 may receive the location information and other action/state information regarding a user holding a controller, colors assigned to the tracking lights on the controller or other game objects etc. in a space using the cameras 702 and 704. The VR server 724 may be realized as a software program stored in a memory and executing on a central processing unit (CPU).

The VR server 724 may use video images from the tracking cameras 702,704. In some embodiments, the VR server 724 receives video images over video cables connected to the cameras, however the images may be transferred wirelessly. Possible video cable types include analog formats such as composite video, S-Video and VGA; and digital formats such as HDMI and DVI, however these are mere exemplary embodiments and the possibilities are not limited thereto. In another embodiment, the slave server receives video images over a wireless communication connection.

The VR server 724 may follow the procedures described in FIG. 2, FIG. 4 and FIG. 6 for assignment and reassignment of colors to the tracking marker lights, and synchronization and calibration of the cameras 702,704.

The present disclosure emulates a real-world experience for players, and as such the experience players have is quite real, just as pilots in flight simulators experience all the aspects of flying a real airplane. The disclosure is deeply intertwined with computer and networking technology without which it would not be possible. In fact, the functions described herein have an extremely time-sensitive nature to their operation in order to achieve a true virtual reality experience, and without an intimate integration with the described hardware would not function properly, if at all.

The dynamic reassignment of colors during a game based on changing distances between light markers having the same color is a function grounded in reality. The use of a physical calibration device to calibrate distances for each camera as well as the process for synchronizing positions among a plurality of cameras, are all concrete functionalities The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the servers are implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

Virtual reality systems and virtual reality gaming systems need to give their users and players a positive experience with no appreciable delay between player movements and actions; and the resultant virtual display. Virtual reality systems need to work in a variety of different environments—for example with 4 players or 60 players; with differing arena sizes and with differing numbers of cameras. A critical part of a virtual reality system is the tracking server. A single machine and its communication interface cannot easily support the video data bandwidth of large numbers of high-definition cameras; and does have enough computing power to identify player's tracking markers in real-time. A single video frame of 3×8-bit RGB, 1080p requires 1920×1080×3 bytes, i.e., approximately 6 MB. At frames rates of 60 HZ, each camera generates approximately 0.36 GB/sec. This is a high input bandwidth for today's computers, and one computer can support the video data bandwidth of only a small number of high-definition cameras. The tracking system locates players and moveable objects by identifying tracking markers in the cameras' video images. Searching every camera image for tracking markers in real-time requires a large amount of computation, exceeding the abilities of today's normal computers.

The Hierarchical Tracking System (HTS) solves these problems by distributing the data bandwidth and computational loads across multiple machines. Multiple Slave Tracking Servers (STS) share the data bandwidth and computational loads. A Master Tracking Server (MTS) controls the STS, combines their results, communicates with the Game Server and sends position results to the Game Server. In a common embodiment, each STS is connected to a different subset of the cameras, so that each camera is connected to exactly one STS. In alternate embodiments the assignments of cameras to STS is flexible allowing the HTS to better tune the performance of the overall virtual reality system.

Each STS normally searches for tracking markers in every image of every camera it supports. Each STS communicates its results to the MTS. The data band width between each STS and the MTS is miniscule compared to the camera video data bandwidth. One computer may host the functions of both a MTS and a STS because the MTS resource requirements are much lower.

To reduce the computational requirement for finding tracking markers in the image, the HTM tries to maintain an expected position for each tracking marker. The HTM determines the current positions of tracking markers and estimates motion vectors that help predict most-likely future positions. The motion vector is computed by comparing previous positions. Each STS starts its tracking-marker search at the expected position and if necessary searches around the expected position in a circular manner. The HTS further reduces the computational requirement by estimating the required search range. For example, if a player cannot move faster than 12 cm in ⅙₀ second, the HTS can use that number to determine the maximum distance that a tracking marker could move within an image.

The HTM needs to be aware that tracking markers are often obscured from one or more cameras. A camera will not have a clear view of a tracking marker if a different tracking marker is in from of it or if a player's body is shielding it. Thus the STS and MTS need to manage both found and not found marker positions. The HTM also needs to search for any new tracking markers which will have unknown positions. For example, when a new player enters the arena the HTM will have to find the tracking markers associated with that player. The search for new tracking markers need not be as time-critical as the search for known tracking markers because new players will not expect instantaneous response when they first enter the arena.

Figure 8:
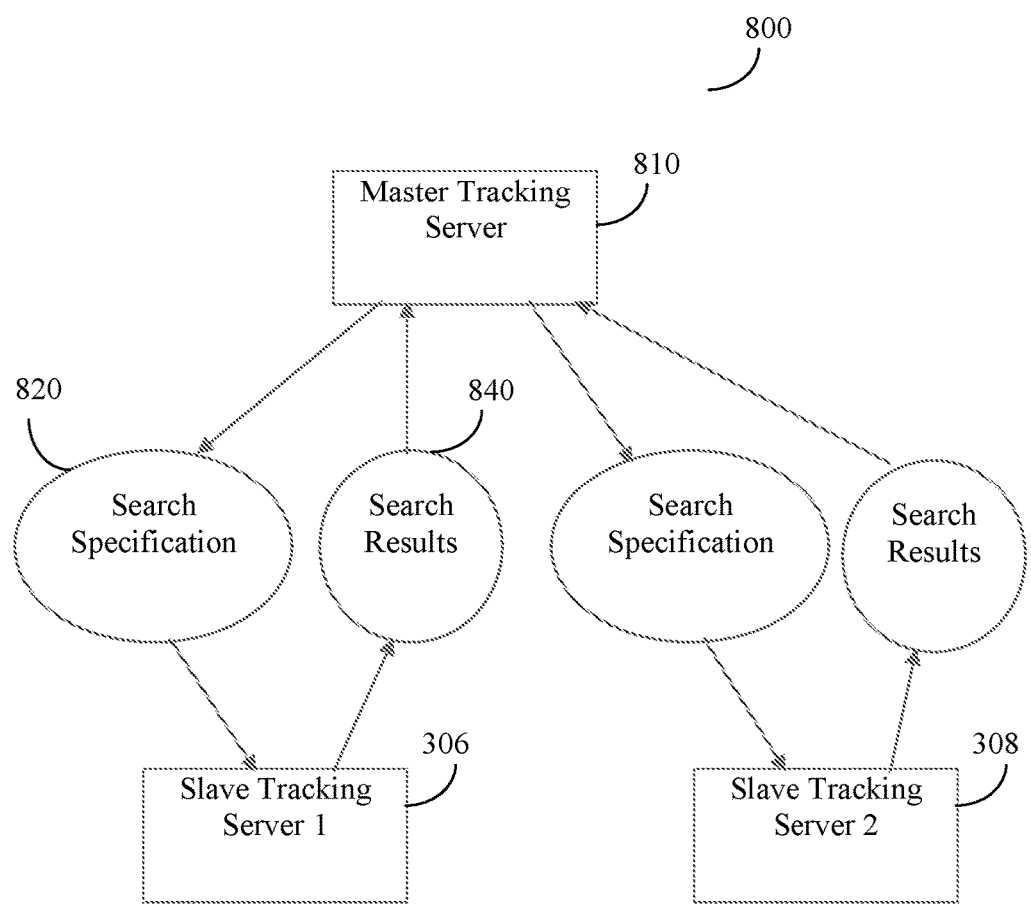
FIG. 8 shows a master tracking server sending search specifications to slave tracking servers and getting back search results.

FIG. 8 is a diagram 800 showing a master tracking server (MTS) 810 sending a search specification 820 to slave tracking server 1 306 and getting back search results 840. MTS 810 communicates with slave tracking server 2 308 in a similar manner. The MTS-STS communication can be achieved over a wired or wire-less connection. The MTS-STS communication can be implemented in multiple ways including sending network packets using socket programming. Many possible STS-MTS communication protocols are possible. The division of functionality between the MTS and STS affects the choice of communication protocol. The primary communication from MTS 810 to STS 306 is via a search specification 820. Other MTS-to-STS commands provide initialization data such as the 3-dimensional camera positions and tell the STS to start, stop or shutdown. A simple form of search specification 820 contains:

a list of known tracking markers with
- a. a tracking marker identifier
- b. the color of the tracking marker
- c. the expected position of the tracking marker
- d. the search range of the tracking marker new-unknown-tracking-marker search parameters Each tracking marker has a unique tracking marker identifier assigned by the MTS. The MTS specifies the color of the tracking marker. The MTS specifies an expected position and search range for each tracking marker. The MTS computes the expected position and search range in one of several ways, including:

1. If the MTS has determined a tracking marker's position twice in a row, it computes a motion vector to help determine the next expected tracking marker position. The motion vector is a vector formed from the last two positions. The MTS adds the motion vector to the last position to generate the expected position. In this situation the search range is based on the maximum distance that a player could move during a video frame interval.
2. If the MTS has not determined a tracking marker's position twice in a row, but has determined a recent position it uses the most recent position, appropriately adjusted by the most recent motion vector if known. The search range is based on the maximum distance that a player could move since the most recent position.
3. If the MTS has not determined a tracking marker's position for several cycles, the MTS tries to make use of a complimentary tracking marker. For example, if the primary tracking marker position is known the MTS will assume that the secondary tracking marker is within a known distance away. In this case the MTS will specify the primary tracking marker's expected position and a search range equal to the actual distance between primary and secondary markers.

The optional new-unknown-tracking-marker search parameters provide guidance on how to search for new unknown markers. In one example STS-MTS communication protocol, the STS does not need the new-unknown-tracking-marker search parameters because it uses whatever free time it has to search for new unknown-tracking-markers. In this case the STS can start searching the first images of each camera from top-to-bottom, left-to-right; and then stop when it runs out of time. The STS searches subsequent images starting at the position where it last stopped. In a second example of the STS-MTS communication protocol the new unknown-tracking-marker search parameters specify which area of the images to search. In a third example the new unknown-tracking-marker search parameters specify the maximum amount of time that the STS can use for searching.

An alternate search specification may include additional fields to allow the STS to make more intelligent decisions. Example additional fields include: the motion vector, a status field indicating the tracking marker type and whether the tracking has been located on the last few attempts.

Search results 840 specify 3-dimensional vectors between cameras and tracking markers. The vectors can be specified in different ways including: a) pitch, roll and yaw angles relative to specified camera; b) as x, y and z differences compared to a specified camera; and c) as a pair of xyz coordinates. Search results 840 can be specified in multiple ways including:

i) The list of results has tracking marker id and vector pairs. Each list entry corresponds to a case where a specific tracking marker was found using a camera. The list excludes cases where a camera could not find a specific tracking marker. Unknown tracking marker vectors can be indicated by specifying an unknown tracking id such as −1.

ii) The list of results has multiple entries with a tracking marker id, a camera id, a found/not-found/unknown-found status, a color-found and a vector. Unknown-position tracking markers usually have color white.

Figure 9:
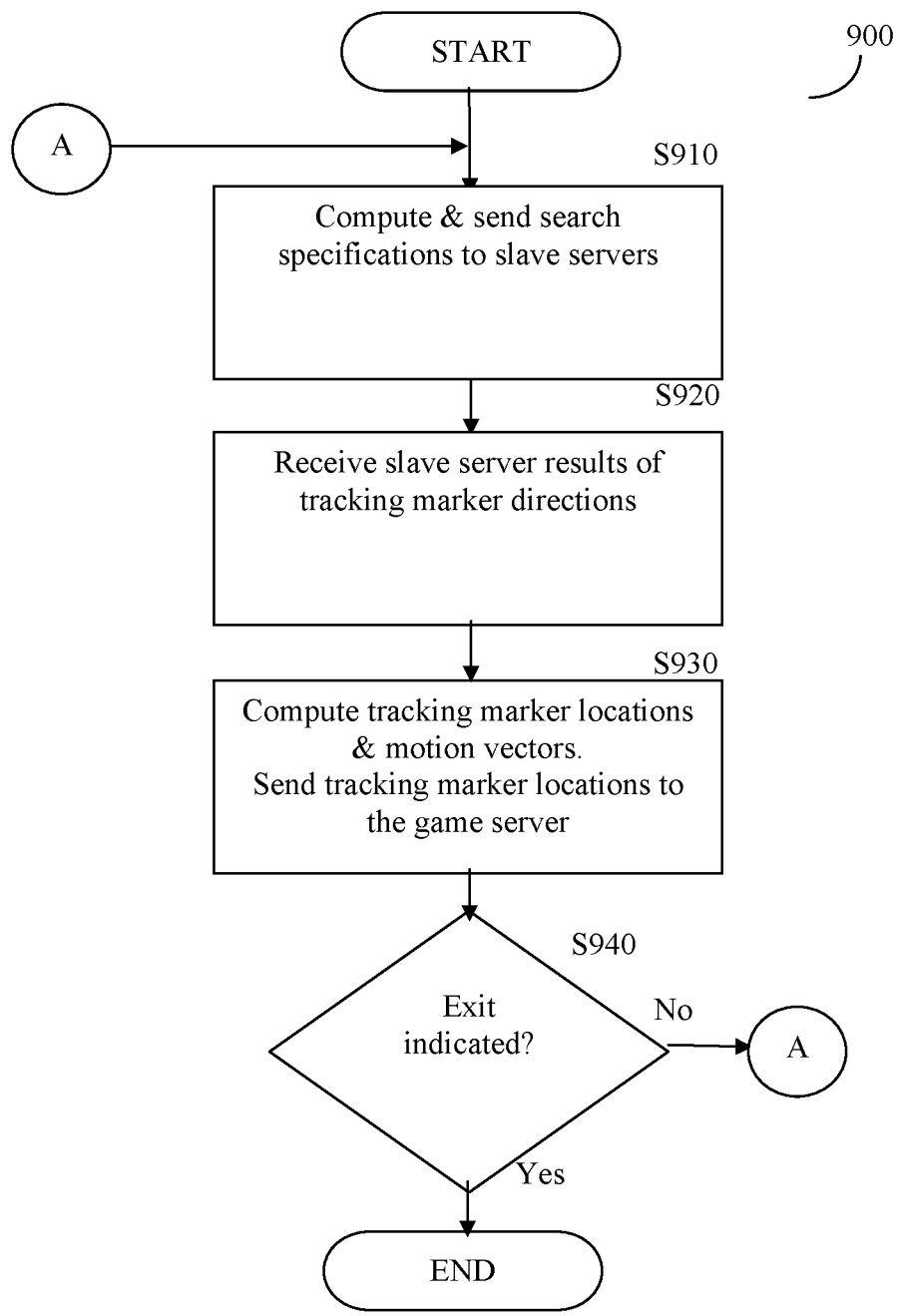
FIG. 9 shows a flowchart for an exemplary process of a master tracking server.

FIG. 9 shows a flowchart 900 for an exemplary process of a master tracking server. This example assumes that the MTS makes most of the decisions. In S910 the MTS prepares search specifications and then sends those search specifications to the STS. In this example the MTS sends the same search specification to each STS. For each known tracking marking, the MTS determines an expected position and search range as described earlier. In S920 the MTS reads search results from each of the STS. In S930 the MTS tries to determine the position of each known tracking marker by finding the best point of intersection of that tracking marker's vectors. The MTS computes a motion vector for every known tracking marker with a recently determined position. The MTS communicates with the game server and sends updated tracking marker positions. In S940 the MTS checks to see if it should exit. The game server can send a message telling the MTS to stop or shutdown. If the MTS needs to exit, it will send appropriate messages to the STS to make them stop and then stop itself. If the MTS does not need to exit it continues at S910.

On one example STS-MTS communication protocol the MTS completes all the above activities for each camera video frame. In different embodiments some of the activities may be pipe-lined resulting in less accuracy in some cases. For example, each STS could be reading one camera image while it searches for tracking markers in a previous image.

In one embodiment the cameras are synchronized so that all cameras images are captured at the same time. In a second embodiment the camera images may be captured at slightly different times and hence the determined positions may have some inaccuracy.

Figure 10:
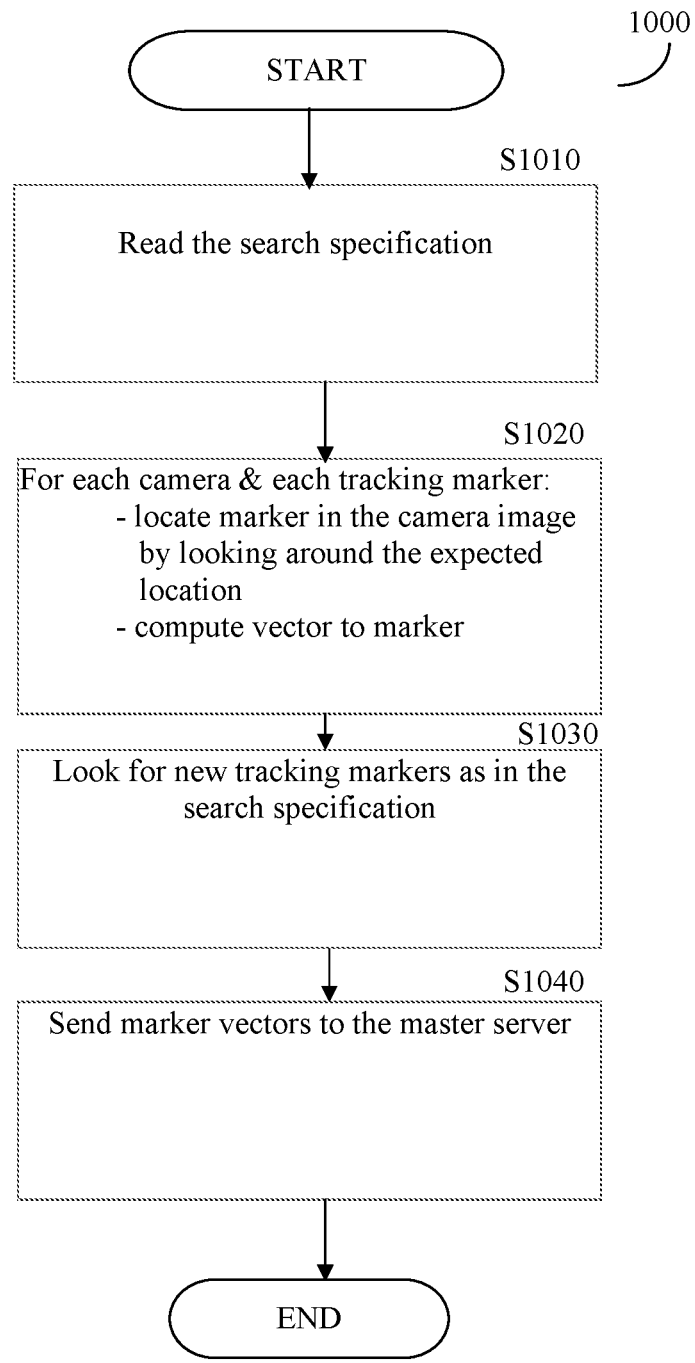
FIG. 10 shows a flowchart for an exemplary process of a slave tracking server.

FIG. 10 shows a flowchart for an exemplary process for a slave tracking server. In S1010 the STS reads the search specification from the MTS. In S1020 the STS searches each camera's latest image for each of the tracking markers as described earlier. The STS starts searching for each tracking marker color at the tracking marker's expected tracking position. The STS searches outwards in a circular manner until it finds the tracking marker or exceeds the search range. The STS translates the search range from a physical distance into a range of pixels in the image. If the STS finds the tracking marker it computes a 3-dimensional vector from the camera to the tracking marker as described earlier. In S1030 the STS searches for new tracking markers using the new-unknown-tracking-marker search parameters as described earlier. If the STS finds a new tracking marker it computes a 3-dimensional vector from the camera to the tracking marker as described before. In S1040 the STS sends its search results to the master server.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method comprising:
   preparing one or more search specifications;
   communicating the one or more search specifications to a plurality of slave tracking servers;
   reading search results from each plurality of slave tracking servers based on the search specification;
   determining the position of each known tracking marker by finding a best point of intersection of a tracking marker's vectors based using the search results;
   computing a motion vector for each known tracking marker with the determined position; and
   communicating updated tracking marker positions based on the computed motion vector and determined position to a game server,
   wherein the one or more search specifications comprise a list of known tracking markers, and for each of the known tracking numbers, a tracking marker identifier, the color of the tracking marker, the expected position of the tracking marker, the search range of the tracking marker,
   wherein one or more search specifications further comprise new-unknown-tracking-marker search parameters.

2. The method of claim 1, further comprising, for each tracking marker:
   assigning the tracking marker identifier to the tracking marker;
   specifying the color of the tracking marker; and
   specifying an expected position and search range.

3. The method of claim 2, further comprising, for each tracking marker:
   computing the expected position and search range.

4. The method of claim 1, wherein the method is completed on one camera video frame at a time.

5. The method of claim 1, wherein the search results comprise 3-dimensional vectors between a camera and a tracking marker.

6. The method of claim 5, wherein the 3-dimensional vectors comprise pitch, roll and yaw angles relative to specified camera.

7. The method of claim 5, wherein the 3-dimensional vectors comprise x, y and z differences compared to a specified camera.

8. The method of claim 5, wherein the 3-dimensional vectors comprise a pair of xyz coordinates.

9. The method of claim 1, wherein the search results comprise a list of tracking marker identifiers and vector pairs.

10. The method of claim 9, wherein unknown tracking marker vectors are indicated in the search results by specifying an unknown tracking identifier.

11. The method of claim 1, wherein the search results comprise a list of tracking marker id, a camera id, a found/not-found/unknown-found status, a color-found and a vector.

12. A method comprising:
    reading a search specification received from a master tracking server;
    searching each camera's latest image for each of the tracking markers;
    searching for each tracking marker color at the tracking marker's expected tracking position;
    searching outwards in a circular manner until it finds the tracking marker or exceeds the search range;
    translating the search range from a physical distance into a range of pixels in the image;
    computing a 3-dimensional vector from the camera to the tracking marker;
    preparing search results, the search results comprising the 3-dimensional vector of the located tracking marker;
    transmitting the search results to the master tracking server,
    searching for new tracking markers using new-unknown-tracking-marker search parameters; and
    computing a 3-dimensional vector from the camera to the tracking marker,
    wherein the search results further comprise the 3-dimensional vector of the new tracking markers.

13. The method of claim 12, wherein the cameras are synchronized so that all cameras images are captured at the same time.

14. The method of claim 12, wherein the camera images are captured at different times.

15. The method of claim 12, further comprising reading one camera image while searching for tracking markers in a previous image.

16. The method of claim 12, wherein the method is completed on one camera video frame at a time.

17. The method of claim 12, wherein the new-unknown-tracking-marker search parameters provide guidance on how to search for new unknown markers.

* * * * *